US011226940B2

(12) United States Patent
Ande et al.

(10) Patent No.: US 11,226,940 B2
(45) Date of Patent: Jan. 18, 2022

(54) ADAPTING DATA FOR CHANGES TO DATA ATTRIBUTES

(71) Applicant: Oracle International Corporation, Redwood Shores, CA (US)

(72) Inventors: Srikanth Ande, Guntur (IN); Eakta Aggarwal, Hyderabad (IN); Richard Yungning Liu, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 702 days.

(21) Appl. No.: 14/659,426

(22) Filed: Mar. 16, 2015

(65) Prior Publication Data

US 2016/0275132 A1    Sep. 22, 2016

(51) Int. Cl.
 *G06F 16/21* (2019.01)
(52) U.S. Cl.
 CPC .................................. *G06F 16/213* (2019.01)
(58) Field of Classification Search
 None
 See application file for complete search history.

(56) References Cited

U.S. PATENT DOCUMENTS

| | | | | |
|---|---|---|---|---|
| 5,897,642 A * | 4/1999 | Capossela | ................. | G06F 8/71 |
| 6,367,077 B1 * | 4/2002 | Brodersen | ................. | G06F 8/65 |
| | | | | 707/E17.032 |
| 6,735,766 B1 * | 5/2004 | Chamberlain | ............ | G06F 8/65 |
| | | | | 709/203 |
| 7,076,778 B2 * | 7/2006 | Brodersen | ................. | G06F 8/65 |
| | | | | 707/E17.032 |
| 7,155,462 B1 * | 12/2006 | Singh | ........................ | G06F 8/65 |
| | | | | 707/695 |
| 7,350,191 B1 * | 3/2008 | Kompella | ................. | G06F 8/61 |
| | | | | 707/999.005 |

(Continued)

OTHER PUBLICATIONS

'What is an rpd file and webcat file?'. Oracle Community discussion [online]. Oracle Technology Network, Jun. 12, 2008 [retrieved Oct. 27, 2014]. Retrieved from the Internet: <URL: https://community.oracle.com/thread/671187?start=0&tstart=0>, 2 pages.

(Continued)

*Primary Examiner* — Ashish Thomas
*Assistant Examiner* — Mellissa M. Ohba
(74) *Attorney, Agent, or Firm* — Kilpatrick Townsend & Stockton LLP

(57) ABSTRACT

A method for adapting data for changes in attributes associated with the data (e.g., data related to an enterprise) may include techniques for modifying attributes associated with data corresponding to a change in those attributes based on a change in a product (e.g., an application, a computer system, a computer program product, or a service). The data adaptation techniques may include determine attributes that have changed based on adaptation information that indicates changes in attributes associated with data accessed by the product. The adaptation may indicate conditions for those changes, such as a condition that indicates a change to an attribute corresponding to a change from one version of a product to another version of the product. Upon determining that a condition for a change to an attribute has occurred, the attribute may be modified based on the change.

20 Claims, 10 Drawing Sheets

(56) References Cited

U.S. PATENT DOCUMENTS

| | | | | |
|---|---|---|---|---|
| 8,868,506 | B1* | 10/2014 | Bhargava | G06F 16/219 |
| | | | | 707/648 |
| 9,058,193 | B2* | 6/2015 | Murray | G06F 9/44536 |
| 9,189,220 | B2* | 11/2015 | Gill | G06F 8/61 |
| 9,542,164 | B1* | 1/2017 | Mosterman | |
| 2002/0129352 | A1* | 9/2002 | Brodersen | G06F 8/65 |
| | | | | 717/174 |
| 2004/0117358 | A1* | 6/2004 | von Kaenel | G06Q 40/08 |
| 2005/0160419 | A1* | 7/2005 | Alam | G06F 8/656 |
| | | | | 717/174 |
| 2005/0248457 | A1* | 11/2005 | Himberger | G06F 21/552 |
| | | | | 340/541 |
| 2005/0257211 | A1* | 11/2005 | Chatterjee | G06F 8/656 |
| | | | | 717/170 |
| 2006/0026168 | A1* | 2/2006 | Bosworth | H04L 67/1095 |
| 2007/0299858 | A1* | 12/2007 | Norcott | G06F 16/219 |
| 2009/0228879 | A1* | 9/2009 | Blohm | G06F 8/60 |
| | | | | 717/174 |
| 2009/0307650 | A1* | 12/2009 | Saraf | G06F 8/65 |
| | | | | 717/101 |
| 2011/0022603 | A1* | 1/2011 | Khader | G06F 8/65 |
| | | | | 707/748 |
| 2011/0022637 | A1* | 1/2011 | Khader | G06Q 10/06 |
| | | | | 707/793 |
| 2011/0023014 | A1* | 1/2011 | Harper | G06F 8/70 |
| | | | | 717/108 |
| 2011/0246978 | A1* | 10/2011 | Alfano | G06F 8/61 |
| | | | | 717/171 |
| 2013/0124807 | A1* | 5/2013 | Nielsen | G06F 11/1438 |
| | | | | 711/162 |
| 2014/0095432 | A1* | 4/2014 | Trumbull | G06F 16/00 |
| | | | | 707/610 |
| 2015/0135170 | A1* | 5/2015 | Murray | G06F 9/45516 |
| | | | | 717/148 |
| 2015/0358309 | A1* | 12/2015 | Edwards, Jr. | G06F 11/1402 |
| | | | | 726/6 |

OTHER PUBLICATIONS

McGale, John. 'How the OBIEE RPD Relates to the Data Warehouse'. Blog [online]. Performance Architects, Inc., Mar. 29, 2013 [retrieved Oct. 27, 2014]. Retrieved from the Internet: <URL: http://www.performancearchitects.com/wp/2013/03/29/rpd-vs-the-data-warehouse/ >, 3 pages.

Guha, Arun. 'Fusion BI RPD and Webcat files'. A-Team Chronicles [online]. Oracle, Jun. 20, 2013 [retrieved Mar. 18, 2015]. Retrieved from the Internet: <URL: http://www.ateam-oracle.com/fusion-bi-rpd-and-webcat-files/>, 9 pages.

* cited by examiner

```
<PRODUCT DATA>
  <SUBJECT AREA NAME="PAYABLES INVOICES - HOLDS REAL TIME">
    <FOLDER NAME="HEADER INFORMATION">
      <DATA NAME="INVOICE TYPE DESCRIPTION">
      </DATA>
    </FOLDER>
    <FOLDER NAME="FINANCIAL BUSINESS UNIT">
    </FOLDER>
  </SUBJECT AREA>
  <SUBJECT AREA NAME="TRANSACTIONS REAL TIME">
    <FOLDER NAME="INVOICE LINE DETAILS – TAX INFORMATION">
      <DATA NAME="JURISDICTION NAME CODE">
      </DATA>
    </FOLDER>
  </SUBJECT AREA>
</PRODUCT DATA>
```

FIG. 3

| CODE | SA Name (Previous Release) | Folder Name (Previous Release) | Attribute Name (Previous Release) | SA Name (Current Release) | Folder Name (Current Release) | Attribute Name (Current Release) |
|---|---|---|---|---|---|---|
| ATTR_REMOVE | Payables Invoices - Holds Real Time | - Header Information | Invoice Type Description | NULL | NULL | NULL |
| FOLDER_REMOVE | Payables Invoices - Holds Real Time | Financial Business Unit | NULL | NULL | NULL | NULL |
| ATTR_RENAME | Payables Invoices - Transactions Real Time | - Invoice Line Details - Tax Information | Jurisdiction Name Code | Payables Invoices - Transactions Real Time | - Invoice Line Details - Tax Information | Tax Jurisdiction Code |
| FOLDER_RENAME | Payables Invoices - Trial Balance Real Time | Invoice General Details | NULL | Payables Invoices - Trial Balance Real Time | Invoice Details | NULL |
| SA_RENAME | Payables Invoices - Prepayment Invoice Distributions Real Time | NULL | NULL | Payables Invoices - Prepayment Applications Real Time | NULL | NULL |
| FOLDER_RESTRUCTURE | Payables Invoices - Prepayment Invoice Distributions Real Time | - Prepayment Application Distribution Details | NULL | Payables Invoices - Prepayment Applications Real Time | Prepayment Application Details | NULL |
| ATTR_RESTRUCTURE | Payables Invoices - Prepayment Invoice Distributions Real Time | - Invoice Line Details - General Information | Unit Price | Payables Invoices - Prepayment Applications Real Time | - Invoice Line Details - Purchase Order Information | Unit Price |
| LAST_ATTR_RENAME | Payables Invoices - Transactions Real Time | - General Information | Intercompany Flag Meaning | Payables Invoices - Transactions Real Time | - General Information | Intercompany Invoice |

ADAPTING DATA FOR CHANGES TO DATA ATTRIBUTES

BACKGROUND

The present disclosure relates generally to adapting data for changes in attributes associated with the data. More particularly, techniques are disclosed for modifying attributes associated with data based on a change in those attributes corresponding to a change in a product (e.g., an application, a computer system, a computer program product, or a service).

An organization may implement many types of products, such as applications, services, and computer systems designed to use data related to an enterprise. Data related to an enterprise may indicate, for example, information about expenses, payables, ledgers, accounting, collections, cache management, budget, information technology, employees, human resources, employment, operations, management, receivable, revenue, and assets, all of which may be related to an enterprise. Some applications may use the data to display information indicated by the data in a user-friendly format (e.g., a graphical dashboard or a data report). The data may be associated with one or more attributes. The attributes may be used to identify different types of information in the data. For example, an attribute may indicate organization or a relationship of information in the data, such as a folder or a group of data related to a subject area. An attribute may be used to identify a type of information in the data.

Some products may be implemented to rely on the attributes associated with data to obtain information from the data. However, the attributes may be specific to a version (e.g., a release) of the product. The attributes associated with the data may change (e.g., renaming of an attribute, restructuring of a folder, or removing an attribute) corresponding to a change in a version of the product from one version to another version of the application. For example, the change in the version of the product may correspond to an upgrade or a downgrade of a version of the product. Changes in attributes may correspond to a change in a function related to use of the data by the product.

An error can be encountered when using from data associated with attributes is accessed by a product because one or more attributes associated with the data may have changed for a different version of the product. As a result, an error may occur when accessing the data because the product is not able to determine information from the data due to a change in an attribute associated with the data. The error may leave the product unusable to access the data. To resolve the error, the data and/or the product may be manually configured to accommodate any changes attributes associated with the data corresponding to a change in a version of the product.

For an organization that has hundreds of applications that depend on large volumes of data associated with attributes, a considerable amount of financial and/or human resources may be spent to manually configure changes in those attributes to prevent errors from occurring when the data is accessed. Organizations may risk to lose money and business from their customers or users, some of whom may be are unable to obtain information from critical applications and systems that encounter errors when attributes associated with data have changed.

BRIEF SUMMARY

The present disclosure relates generally to adapting data for changes in attributes associated with the data (e.g., data related to an enterprise). More particularly, techniques are disclosed for modifying attributes associated with data corresponding to a change in those attributes based on a change in a product (e.g., an application, a computer system, a computer program product, or a service).

In certain embodiments, data may be accessed for a version (e.g., a current version) of a product. For example, a user operating a client device may request access to view information (e.g., a report) based on data for a version of a product. One or more attributes of the data (e.g., an attribute name) may have changed (e.g., an attribute is renamed, an attribute is restructured, or an attribute has been removed) corresponding to a change in the version of the product, e.g., a change from the previous version of the product to the current version of the product. In some embodiments, while the current version of the product may be accessed by the user at a client device, the data accessed by the product may correspond to data migrated from a previous version of the product. In some embodiments, the data may be associated with attributes corresponding to a previous version of the product. Some of the attributes corresponding to the previous version may not be recognized by the current version of the product. To avoid or reduce errors caused by a change in an attribute, a data adaptation system may implement a data adaptation process to automatically adapt the attribute for a current version of the product accessing the data.

The data adaptation process may modify the attribute(s) that have changed corresponding to a change from one version of a product to another version of the product. The data adaptation process may be automated such that upon request for access to data, the data may be analyzed for changes in any attributes, and accordingly adapted based on a version of a product for which data is being accessed.

In some embodiments, data adaptation system may manage adaptation information that indicates information about attributes associated with the data corresponding to a product. The adaptation information may indicate a type of change (e.g., renaming, restructuring, or removing) to an attribute corresponding to a change in product. The adaptation information may indicate a condition for the type of change, such as a change from one version of the product to another version of the product. The data adaptation system may use the adaptation information to determine whether any attributes associated with data have changed for a product.

Based upon identifying a change in one or more attributes associated with data for a product, the data adaptation system may "adapt" the data by modifying one or more of the attributes that have changed. The attributes that have changed can be modified according to the change indicated by the adaptation information. The data, once adapted, may be updated in storage so that when accessed, information in the data may be accessed based on the attributes defined for the version of the product for which the data is being accessed.

In at least one embodiment of the present invention, techniques may be implemented to adapt data for changes in attributes associated with the data. The techniques may be implemented by a computing system. The computing system may be implemented for a data adaptation system. In certain embodiments, a method is disclosed. The method may include accessing data related to an enterprise. The data may be associated with a plurality of attributes. The plurality of attributes may correspond to a first version of an application. The method may include determining a change in the plurality of attributes associated with the data. The change may be based on a modification of the application from the first version of the application to a second version of the application. In some embodiments, the modification of the application may correspond to an upgrade of the application from the first version of the application to the second version of the application. In some embodiments, the modification of the application may correspond to a downgrade of the application from the first version of the application to the second version of the application. The method may include identifying, based on the determined change in the plurality of attributes, a change to a first attribute in the plurality of attributes. The method may include modifying, based on the change to the first attribute, the first attribute associated with the data. The method may include generating, for the second version of the application, a report based on the data. The report may be generated using the plurality of attributes including the modified first attribute.

In some embodiments, a change in the plurality of attributes is determined using a data file. The data file may indicate a change to one or more attributes of the plurality of attributes corresponding to the modification of the application.

In some embodiments, the first attribute is a name and the change in the first attribute is renaming the first attribute.

In some embodiments, the first attribute corresponds to a name of a folder and the change to the first attribute is renaming the name of the folder.

In some embodiments, the first attribute corresponds to a name of a subject area and the change to the first attribute is renaming the subject area.

In some embodiments, the change to the first attribute is removing an association of the first attribute with the data.

In some embodiments, the change to the first attribute is restructuring the data associated with the first attribute. The first attribute may have a relationship with a second attribute of the plurality of attributes. Restructuring the data associated with the first attribute may include changing the relationship of the first attribute with the second attribute to a relationship between the first attribute and a third attribute of the plurality of attributes. In at least one embodiment, the first attribute corresponds to a name, the second attribute corresponds to a name of a first folder, and the third attribute corresponds to a name of a second folder. In at least one embodiment, the first attribute corresponds to a name of a folder, the second attribute corresponds to a name of a first subject area, and the third attribute corresponds to a name of a second subject area.

Yet other embodiments relate to systems and machine-readable tangible storage media which employ or store instructions for the methods and the operations described above.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 3 illustrates an example of data associated with a plurality of attributes according to some embodiments of the present invention.

FIG. 4 depicts an example of a data structure of information about changes to data attributes according to some embodiments of the present invention.

FIG. 6 illustrates an example of a graphical user interface to access data according to some embodiments of the present invention.

DETAILED DESCRIPTION

Figure 1:
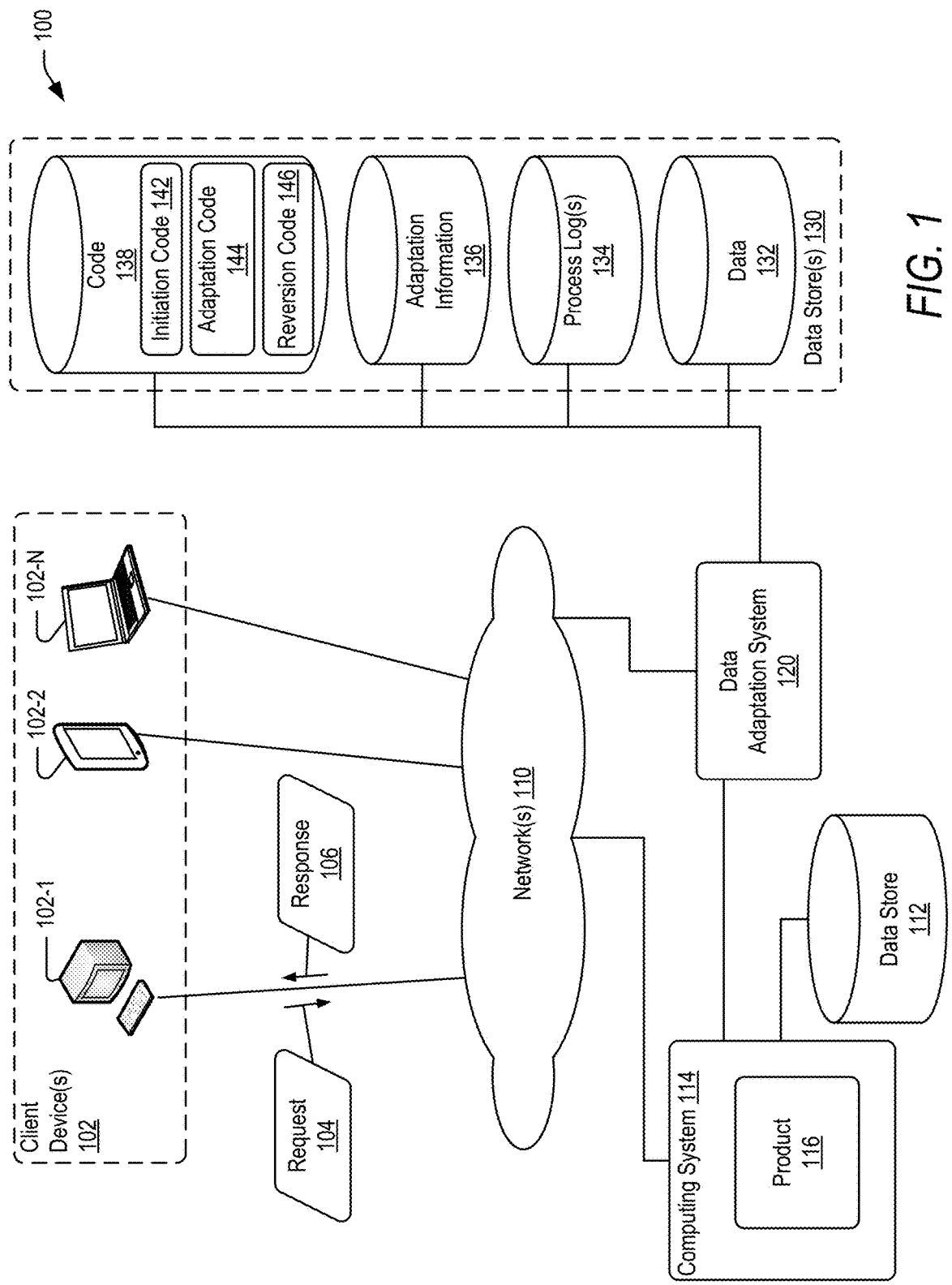
FIG. 1 depicts a simplified high level diagram of a computing system for adapting data to changes in data attributes according to some embodiments of the present invention.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to adapting data for changes in attributes associated with the data (e.g., data related to an enterprise). More particularly, techniques are disclosed for modifying attributes associated with data corresponding to a change in those attributes based on a change in a product (e.g., an application, a computer system, a computer program product, or a service).

In certain embodiments, data may be accessed for a version (e.g., a current version) of a product. For example, a user operating a client device may request access to view information (e.g., a report) based on data for a version of a product. One or more attributes of the data (e.g., an attribute name) may have changed (e.g., an attribute is renamed, an attribute is restructured, or an attribute has been removed) corresponding to a change in the version of the product, e.g., a change from the previous version of the product to the current version of the product. In some embodiments, while the current version of the product may be accessed by the user at a client device, the data accessed by the product may correspond to data migrated from a previous version of the product. In some embodiments, the data may be associated with attributes corresponding to a previous version of the product. Some of the attributes corresponding to the previous version may not be recognized by the current version of the product. To avoid or reduce errors caused by a change in an attribute, a data adaptation system may implement a data adaptation process to automatically adapt the attribute for a current version of the product accessing the data.

The data adaptation process may modify the attribute(s) that have changed corresponding to a change from one version of a product to another version of the product. The data adaptation process may be automated such that upon request for access to data, the data may be analyzed for changes in any attributes, and accordingly adapted based on a version of a product for which data is being accessed.

In some embodiments, data adaptation system may manage adaptation information that indicates information about attributes associated with the data corresponding to a product. The adaptation information may indicate a type of change (e.g., renaming, restructuring, or removing) to an attribute corresponding to a change in product. The adaptation information may indicate a condition for the type of change, such as a change from one version of the product to another version of the product. The data adaptation system may use the adaptation information to determine whether any attributes associated with data have changed for a product.

Based upon identifying a change in one or more attributes associated with data for a product, the data adaptation system may "adapt" the data by modifying one or more of the attributes that have changed. The attributes that have changed can be modified according to the change indicated by the adaptation information. The data, once adapted, may be updated in storage so that when accessed, information in the data may be accessed based on the attributes defined for the version of the product for which the data is being accessed.

FIG. 1 depicts a simplified high level diagram of a computing system 100 for adapting data to changes in data attributes according to some embodiments of the present invention. In particular, computing system 100 may be implemented to adapt changes to data for one or more products, e.g., product 116. Examples of products may include, without restriction, a computer system, a computer program product, a service, and an application. In one example, product 116 may be Oracle Business Intelligence Enterprise Edition provided by the Oracle® Corporation.

Computing system 100 may be part of an enterprise computing system, a cloud computing system, or a combination thereof. As shown, computing system 100 includes multiple client devices 102-1, 102-2, . . . 102-N (collectively client devices 102) communicatively coupled to a data adaptation system 120 and computer system 114 via a communication network 110. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

Client devices 102 may be of various different types, including, but not limited to personal computers, desktops, mobile or handheld devices such as a laptop, a mobile phone, a tablet, computer terminals, etc., and other types of devices. A client device can be a user-operated computing device that can be implemented using hardware, firmware, software, or combinations thereof. A client device may include memory and one or more processors. Memory may be coupled to the processor(s) and may include instructions stored thereon which, when executed by the processor(s), cause the processor(s) to implement one or more operations, methods, or processes disclosed herein. Memory may be implemented using any type of persistent storage device, such as computer-readable storage media.

In certain embodiments, a client device may be configured to provide an interface, such as a graphical user interface (GUI). The interface may be provided as part of a product or may enable access to a product. A client device may be configured to implement (e.g., execute and operate) one or more applications. Examples of applications may include, without limitation, a computer application, a web browser, a client application, a proprietary client application, and the like. An application may be part of product or may be implemented to access product. In FIG. 1, client devices 102 may provide access to product 116 using an application implemented for product 116. Examples of GUIs of an application enabling access to a product, e.g., product 116, are described below with reference to FIGS. 6 and 7. In some embodiments, an application implemented by a client device may be accessible or operated via one or more network(s), e.g., network 110.

Communication network 110 may facilitate communications between client devices 102, computer system 114, and data adaptation system 120. Communication network 110 can be of various types and can include one or more communication networks. Examples of communication network 108 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 110 may include any communication network or infrastructure that facilitates communications between client devices 102, computer system 114, and data adaptation system 120.

Computer system 114 may be of various different types, including, but not limited to personal computers, desktops computers, and other types of computer systems. Computer system 114 can be implemented using hardware, firmware, software, or combinations thereof. Computer system 114 may include memory and one or more processors. The memory may coupled to the processor(s) and may include instructions stored thereon which, when executed by the processor(s), cause the processor(s) to implement one or more operations, methods, or processes disclosed herein. Memory may be implemented using any type of persistent storage device, such as computer-readable storage media.

Computer system 114 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, computer system 114 may be coupled to or may include one or more data stores, e.g., data store 112. Data store 112 may store data (e.g., data related to an enterprise) used or accessed by product 116. The data may be associated with one or more attributes, which may be used to identify information in the data and/or to determine a relationship of information in the data. In some embodiments, the attributes associated with data may be stored in the data itself. Examples of data are described with reference to FIG. 3. Data stored by data store 112 may include information related to an enterprise, such as information about expenses, payables, ledgers, accounting, collections, cache management, budget, information technology, employees, human resources, employment, operations, management, receivable, revenue, and assets.

As explained above, product 116 may be a computer system, an application, a service, or a computing program-product, any of which may be implemented on computer system 114. In some embodiments, all or a portion of product 116 may be implemented on a client device, e.g., any one of client devices 102. For example, product 116 may include an application that is implemented on a client device to access a portion of the product 116 implemented on a server computer, e.g., computer system 114. In some embodiments, product 116 may be one or more services, which can be provided in a cloud or a networked environment. These services may include one or more services provided under Software as a Service (SaaS) category, Platform as a Service (PaaS) category, Infrastructure as a Service (IaaS) category, or other categories of services including hybrid services. Product 116 may be accessed via any of client devices 102. In some embodiments, product 116 may be accessed from a client device using an application.

Under the Saas category, services may include capabilities to build and deliver a suite of on-demand applications on an integrated development and deployment platform. Examples services under a Saas category may include, without limitation, services that provide solutions for sales performance management, enterprise integration and business flexibility for large organizations, and the like. In one embodiment, the SaaS services may include Customer Relationship Management (CRM) services (e.g., Fusion CRM services provided by the Oracle cloud), Human Capital Management (HCM)/Talent Management services, and the like.

Under the Paas category, PaaS services may include without limitation services that enable organizations (such as Oracle) to consolidate existing applications on a shared, common architecture, as well as the ability to build new applications that leverage the shared services provided by the platform. Examples of PaaS services include without limitation database cloud services, middleware cloud services (e.g., Oracle Fusion Middleware services) and Java cloud services.

Under the Iaas category, various different IaaS services may be provided to facilitate the management and control of the underlying computing resources such as storage, networks, and other fundamental computing resources for customers utilizing Saas and Paas services.

Data adaptation system 120 can implement techniques for adapting data to accommodate a change in attributes associated with the data access by a product, e.g., product 116. For example, data adaptation system 120 may adapt data (e.g., data in data store 112) accessed by product 116 for a change from one version of product 116 to another version of product 116. For purposes of illustration, a product is described in some embodiments as an application; however, such embodiments are not limited to applications and may include other types of products, such as those described above.

Data adaptation system 120 may be implemented in a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing devices that make up data adaptation system 120 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. In some embodiments, data adaptation system 120 may be implemented in product 116 or a computer system (e.g., computer system 114) in which product 116 is implemented. Data adaptation system 120 may be implemented in a using hardware, firmware, software, or combinations thereof.

Data adaptation system 120 may include at least one memory, one or more processing units (or processor(s)), and storage. The processing unit(s) may be implemented as appropriate in hardware, computer-executable instructions, firmware, or combinations thereof. Computer-executable instruction or firmware implementations of the processing unit(s) may include computer-executable or machine-executable instructions written in any suitable programming language to perform the various operations, functions, methods, and/or processes described herein. The memory in data adaptation system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media.

Data adaptation system 120 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, data adaptation system 120 may be coupled to or may include one or more data stores, e.g., data store 130. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In some embodiments, data adaptation system 120 may be implemented using code 138 stored in data store 130. Code 138 may include initiation code 142 to initiate a data adaptation process implemented by data adaptation system 120. The data adaptation process may be implemented using adaptation code 140. In some embodiments, data adaptation system 120 may implement a data reversion process using reversion code 146. Examples of operation of data adaptation system 120 are described further with reference to FIG. 2.

Data adaptation system 120 may adapt data (e.g., data stored in data store 112) accessed or used by a product, e.g., product 116. Data may need to be adapted for a variety of reasons. For example, data that is migrated from one version of product 116 to another version of product 116 may need to be adapted for change in attributes associated with the data. The data may have been created for one version of a product and may be accessed suing a different version of a product when the product is upgraded or downgraded. Information in the data may be accessed by product 116 using the attributes. The attributes may change (e.g., renamed, removed, or restructured) between different versions of product 116. As such, for data that was produced for one version of product 116 may need to be modified for use by another version of the product. In some embodiments, attributes associated with data may change for a feature or a function of product 116 with respect to the same version. The attributes associated with the data may be modified to those configured for a particular version of product 116. The data may be modified to enable information to be access from the data by product 116 based on attributes configured for the version of product 116.

Data may be accessed by product 116 in a various ways. The data may be accessed by product 116 upon request (e.g., request 104) from a client device to access the data. In some embodiments, an application executing on a client device may request access to data. For example, a user operating any one of client devices 102 may request (e.g., request 104) to view data related to an enterprise. A request may be made through an application on the client device. Data may be accessed by the application to display information indicated by the data in a user-friendly format (e.g., a graphical dashboard or a data report). The information in the data may be obtained based on the attributes associated with the data.

To perform data adaptation, computer system 114 may provide the accessed data from data store 112 to data adaptation system 120 to adapt the data if necessary for access by product. In some embodiments, data adaptation system 120 may automatically implement data adaptation for data accessed by product 116. Data accessed by a product may be placed in a data store, e.g., data store 130 where data adaptation system 120 can access the data for processing. Data adaptation may be implemented to adapt data before the data is accessed for product 116. Once data has been processed by data adaptation system 120, the adapted data may be provided to computer system 114 to be accessed by product 116. In some embodiments, data adaptation system 120 may store a local copy of data in data store (e.g., data 132 in data store 130) before it is adapted. Data that has been adapted may also be stored in data store 130.

Data adaptation may be implemented by data adaptation system 120 using adaptation information 136. Using adaptation information 136, data adaptation system 120 may determine whether any attributes associated with data accessed for product 116 have changed. As explained further below, adaptation information 136 may indicate one or more changes in attributes associated with data and in some embodiments, a condition for those changes. For example, adaptation information 136 may indicate a change in an attribute for product 116. The change may be associated with a condition. For example, the change in the attribute may be associated with a condition that indicate the attribute changes corresponds to a change from one version of product 116 to another version of product 116. Data adaptation system 120 may change the attribute according to the change. If the change is associated with a condition, then the attribute in the data may be modified according to the change if the condition has occurred when data adaptation is performed.

In some embodiments, computer system 114 may send a response (e.g., response 106) to a client device (e.g., client device 102-1) indicating information accessed from data. The information may be accessed by product 116 from data adapted by data adaptation system 120. When information cannot be obtained from data because the data could not be adapted for product 116, the response may include error information indicating an error in accessing the data. The client device may display the error information to the user. Examples of a GUI for displaying error information are described with reference to FIG. 7.

In some embodiments, data adaptation system 120 may generate information indicating a result of data adaptation. The information may be produced in one or more process logs (e.g., process logs 134), which may be stored in data store 130. A response (e.g., response 106) sent to a client device (e.g., client device 102-1) may include the information indicating the result of data adaptation. In some embodiments, when an error occurs during data adaptation, the information in a process log may indicate the error. The client device receiving the response may display information indicating a result of data adaptation.

By adapting data for a product before it is accessed, the data may be automatically adjusted for changes in attributes corresponding to a version the product. As such, when a product accesses the data, possible errors in obtaining information from the data based on attributes may be avoided because the data is adapted to the attributes defined for the version of the product. The data adaptation processes described herein reduce or eliminate the errors in reading data that is migrated between different versions of a product.

Some organizations may have implemented many hundreds of different products, which are constantly modified (e.g., upgraded or downgraded). These products may rely on attributes to obtain information from large volumes of data for those products. The data adaptation techniques described herein reduce the manual configuration and management of such data by automatically adapting the data to changes in attributes associated with the data for those products. Without the data adaptation techniques described herein, a considerable amount of financial and/or human resources may be spent to manually configure and manage changes in attributes to prevent errors from occurring when the data is accessed.

Figure 2:
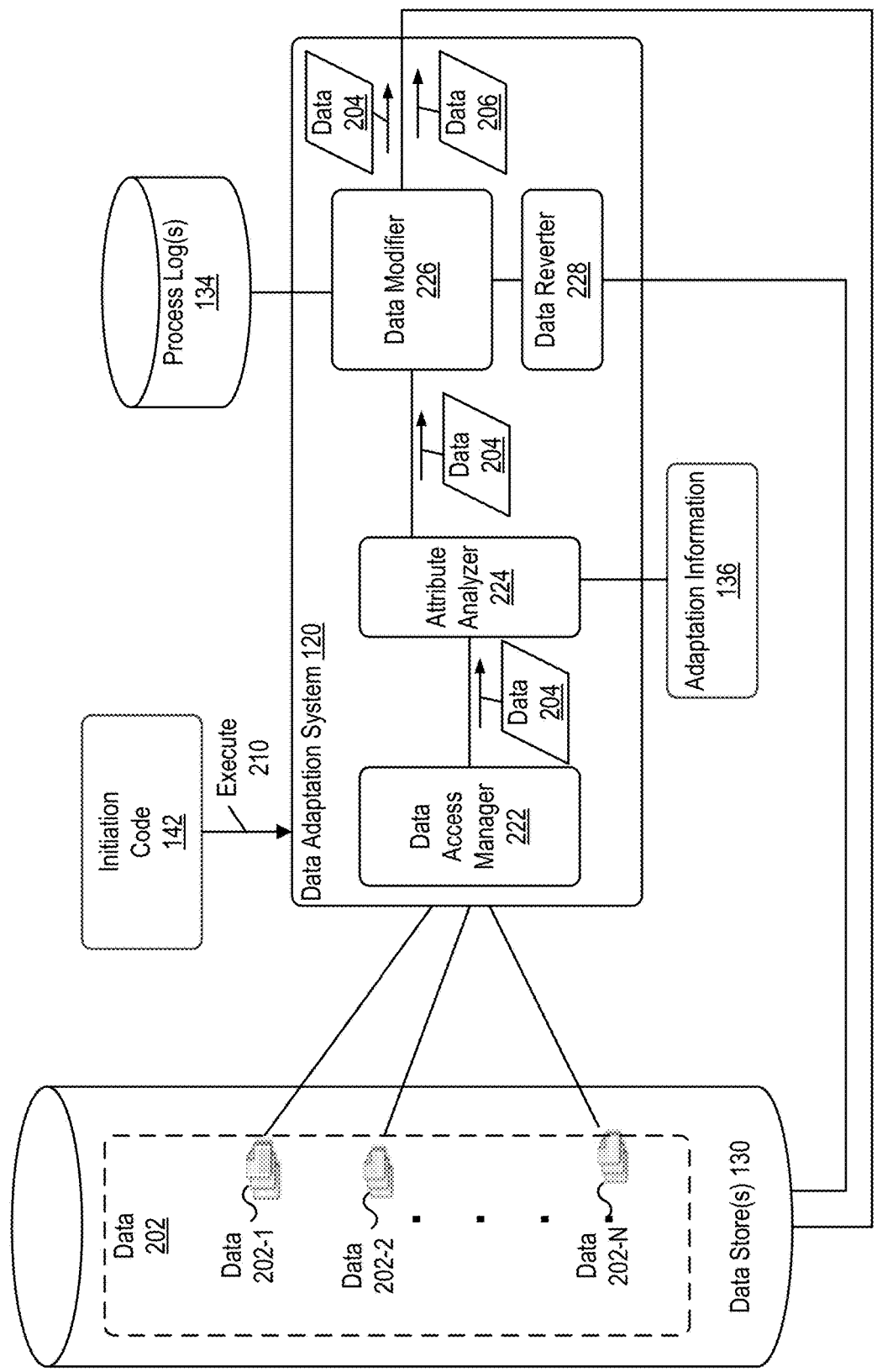
FIG. 2 shows a more detailed high level diagram of a data adaptation system according to some embodiments of the present invention.

FIG. 2 depicts a more detailed high level diagram of data adaptation system 120 according to some embodiments of the present invention. Some embodiments described with reference to FIG. 2 illustrate techniques that data adaptation system 120 may implement to automate the data adaptation process for adapting attributes in the data. Data adaptation techniques disclosed herein may help reduce or eliminate manual modification of data to adapt to changes in attributes.

As shown in FIG. 2, data adaptation system 120 may include several subsystems or modules including a data access manager 222, an attribute analyzer 224, a data modifier 226, and a data reverter 228. These subsystems may be implemented in software (e.g., program code, instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.). For example, all or part of data adaptation system 120 may be implemented using adaptation code 140.

In the examples shown in FIG. 2, an enterprise may have volumes of data, e.g., data 202-1, 202-2, . . . 202-n (collectively, data 202). Examples of data 202 may include data related to an enterprise. Data 202 may correspond to one or more versions of a product (e.g., an application, a service, a computer program product, or a computer system). Data 202 corresponding to a product may be used for operation of that product or may be accessed by the product. For example, data 202 may be used by an application to display information indicated in the data (e.g., generate a report based on the data 202) at a client device (e.g., client device 102). Different portions of data 202 may be used for different versions of a product.

A portion of data 202 may be associated with one or more attributes corresponding to a version of a product. For example, data 202-1, data 202-2, and data 202-3 may each be associated with a different version of a product, each version corresponding to a set of attributes. In another example, each of data 202-1, data 202-2, and data 202-3 may be associated with different products, where data 202-1, data 202-2, and data 202-3 may be associated with a set of attributes corresponding to a different product. A set of attributes corresponding to a version of a product may be different from a set of attributes corresponding to a different version of the same product, or corresponding to a different product, altogether.

One or more attributes associated with a portion of data 202 may change due to various reasons. For example, an attribute associated with data 202-1 for a product may change corresponding to a change from a first version of a product to a second version of the same product. In this example, data 202-1 used with the first version of the product may be migrated for use with a second version of the product. However, the attributes that change in data 202-1 for migration to a different version (e.g., the second version) may not be adjusted in data 202-1 for the second version. As a result, the second version of the product may encounter an error when attempting to obtain information from data 202-1 because data 202-1 is not adapted to the second version of the product. Data adaptation system 120 may automate the data adaptation process to identifying a change in an attribute associated with data and to adapt the data associated with the changed attribute.

In some embodiments, the data adaptation process may be initiated by implementing operations to execute 210 initiation code 142. In some embodiments, initiation code 142 may be executed via input received from a graphical interface or a command prompt at the computing device. As part of an automated data adaptation process, initiation code 142 may be executed automatically to initiate a data adaptation process for data corresponding to any product. In some embodiments, a data adaptation process may be implementing using executable adaptation code 144 stored in code 138. Adaptation code 144 may be configured to adapt data for changes in attributes between different versions of a product. In some embodiments, one or more subsystems and/or modules of data adaptation system 120 may be implemented using adaptation code 144.

Initiation code 142 may be configured with a location in memory of adaptation code 144. In some embodiments, initiation code 142 may be configured with instructions for executing adaptation code 144. Alternatively or additionally, adaptation code 144 may itself be executable. In some embodiments, data adaptation system 120 may implement a data adaptation process to adapt data for changes, if any, in one or more attributes associated with that data. As explained above, one or more attributes associated with data may change. The change may be due to migration of the data from a product, such as a migration of data from one version (e.g., a first version) of the product to another version (e.g., a second version) of the product. Data adaptation system 120 may initiate the data adaptation process automatically when data is accessed. The data adaptation process may be implemented before the data is accessed for a product. Any changes in attributes may be discovered by data adaptation process and the data may be modified for the product. Therefore, data adaptation process may adjust attributes of data to prevent or reduce errors related to a change in one or more attributes associated with the data.

Data access manager 222 may access a portion of data 204 from data 202. Data 204 may include all of data 202 or a portion of data 202. Data manager 222 may access data 204 from one or more data stores (e.g., data store 130). Data 204 may have been requested for a product. Data may be requested for a specific version of a product. Data 204 may be requested in a variety of ways. For example, data access manager 222 may process a request (e.g., request 104) received from a computing device (e.g., client device 102-1) for a product, such as an application. The request may indicate a version of the product for which the data is requested. In another example, data may be requested for implementation of a data adaption process. Such a request may indicate a version to which data is to be adapted to.

Data 204 may be accessed in a product-specific manner that is specific to the product for which the data is being accessed. In another example, data 204 may be a particular portion of data 202 that is accessed for a product. Data 204 may be associated with a version of a product. Data 204 may be associated with attributes specific to a version of a product. The version of the product may be different from a version for which data is requested. As such, data 204 may need to be adapted to a version of the product corresponding to the request.

In some embodiments, data 204 may be accessed from a location in memory indicated by initiation code 142 for initiating an adaptation process. Adaptation code 140 may be configured with a location in memory of data (e.g., data 204) to be adapted. Data may be access from the location in memory.

As part of a data adaptation process, data access manager 222 may determine product information for data 204 that is being accessed. In some embodiments, data 204 may be associated with a product (e.g., a version of a product). Data access manager 222 may determine a version of a product corresponding to data 204 based on information about the product associated with data 204. The product information may be used to determine attribute changes to data 204.

In some embodiments, data access manager 222 can determine product information (e.g., a version of the product) corresponding to a product for which data 204 is being accessed. In some embodiments, accessed data 204 may not be adapted for a version for the product that is requested. Instead, data 204 may be stored for a version different than that which is requested. The attributes associated with data 204 may correspond to a version that is different from the requested version. For example, data 204 may be associated with attributes for one version of a product that is different from a version of the product for which data is requested. As such, data adaptation may be performed to modify attributes associated with data 204 for changes in one or more attributes. The change in attributes may be based on a change in the version of the product for which data is requested. In some embodiments, one or more attributes associated with data 204 may change based on other criteria related to the product (e.g., a change in a function or a feature of a product). The other criteria may be related to the same version of a product.

To implement data adaptation, attribute analyzer 224 may implement operations to determine whether one or more attributes associated with data 204 have changed. To determine whether one or more attributes have changed, attribute analyzer 224 may use adaptation information 136. As explained above, adaptation information 136 may indicate a type of change for each of the attributes that have changed and the condition(s) for those attribute changes. For example, adaptation information 136 may indicate that a name of an attribute may have changed when a product changes from one version to another version. In some embodiments, attribute analyzer 224 can determine whether specific attributes have changed corresponding to data 204 that is requested. Attribute analyzer 224 may determine the condition corresponding to the attribute changes. Examples of adaptation information 136 are described below with reference to FIG. 4.

In some embodiments, attribute analyzer 224 may determine whether attributes in data 204 have changed based on whether any attributes identified in adaptation information 136 are found in data 204. For example, data 204 may be processed to determine whether any of the attributes identified in adaptation information 136 matches an attribute associated with data 204. A matching attribute may be identified as an attribute that has changed in data 204. As described further below, a portion of data 204 corresponding to the identified attribute may be adapted for the change indicated by adaptation information 136.

In determining whether an attribute associated with data 204 has changed, attribute analyzer 224 may further determine whether a condition for a change is associated with any of the attributes in adaptation information 136 that match an attribute associated with data 204. Based on the determined condition(s), attribute analyzer 224 may determine whether those condition(s) have occurred. For example, when a condition for a change in an attribute is a change in a version of a product to another version of the product, attribute analyzer 224 may determine, based on the product information determined by data access manager 222, whether a version of a product accessing data 204 has changed. In some embodiments, data 204 may be associated with a version of a product. The version of the product requesting access to data 204 may be different from the version of the product associated with data 204. Attribute analyzer 224 may determine whether the difference in the version matches the change corresponding to the condition.

In some embodiments, the operations performed by attribute analyzer 224 may be performed in a different order based on organization of adaptation information 136. For example, adaptation information 136 may be organized in a format such that changes to attributes may be associated with a change corresponding to a product (e.g., a change in a version of the product). The attribute changes may be associated with a condition for a change, e.g., a change to a product. Upon determining that the condition of the change is satisfied, the identified attributes in adaptation information 136 may be analyzed to determine whether any are associated with data 204.

Data modifier 226 may produce data 206 ("modified data" or "adapted data"), which is modified based on data 204.

Data modifier 226 may modify data 204 for the attributes that are identified by attribute analyzer 224 as having changed for data 204. Data modifier 226 may modify an attribute in data 204 according to a change in the attribute indicated by adaptation information 136. For example, when an attribute has been renamed from one version of a product to another version of a product, the accessed data may be modified to rename the attribute corresponding to the version of the product that will use the accessed data. Examples of attributes that are modified are described with reference to FIG. 4.

In some embodiments, data 206 may be stored in the same store (e.g., data store 130) that included data 204. Data 206 may be accessed from data store 130 for use by a version of the product data 204 is adapted to by data modifier 226. For example, when the product is an application, the application may access data 206, which has been modified to adapt attribute changes to a version of the product. As such, the application may avoid encountering an error when reading data 206 because the attributes may be adapted to be recognized by the version of the product for which data 204 is requested.

Data modifier 226 may store a copy of data 204 in a data store (e.g., data store 130) before modification of data 204 (e.g., modification for a change in an attribute). A copy of data 204 may be stored so that data 206 may be modified back to data 204 before adaptation by data adaptation system 120. In at least one example, when data is modified for a change in an attribute corresponding to a change from a first version of a product to a second version of a product, data that is modified for the change may be stored before modification of the data. In this example, the stored copy of the data may be relied upon to revert changes to attributes associated with the data for the first version of the product. When the data is requested for the first version of the product, the copy of the data stored before modification (e.g., the reverted data) may be accessed instead of the adapted data that was modified for the second version of the product.

In some embodiments, data modifier 226 may generate output data indicating information about the data adaptation process performed by data adaptation system 120. For example, data modifier 226 may generate an output log (e.g., a log file) indicating information about the result of data adaptation of data 204. The output log may be stored in process log(s) 134. In some embodiments, output log may indicate one or more attributes that could not be modified by data modifier 226. An attribute may not be modified, in some instances, for data adaptation when the attribute is associated with a condition. For example, when a change in an attribute is to remove the attribute and when the attribute is related to a condition in the data, the removed attribute may not be removed. Information may be indicated in an output log about the attribute(s) that could not be adapted (e.g., an attribute that could not be removed). The attribute(s) that could not be adapted may be manually edited in the data.

Data modifier 226 may generate an identifier ("process identifier") to identify each distinct instance of data adaptation that is performed. The process identifier may be a value that is based on a time stamp and a date stamp of an instance when the adaptation process was performed. In some embodiments, the process identifier may be included in a response to a client device (e.g., response 106). The process identifier may be included in the output log. For example, initiation code 142 may be executed with information indicating a request to revert data back to original data before data adaptation. In this example, initiation code 142 may be executed including the process identifier for an instance of data adaptation. In some embodiments, process identifier may be stored with original data (e.g., data 204) before modification. As will be explained below, process identifier may be used to revert data adaptation from data 206 back to data 204.

Data reverter 228 may implement a data reversion process by which adapted data (e.g. modified data 206) is reverted back to data 204. The data reversion process may be implemented using reversion code 146 stored in data store 130. In some embodiments, data reverter 228 may revert modified data 206 to data 204 when initiation code 142 is executed 210. Initiation code 142 may be executed 210 using a process identifier corresponding to an instance of the data adaptation process for modification of data 204 to data 206. Using the process identifier, data reverter 228 may retrieve data (e.g., data 204) corresponding to the process identifier and may revert modified data (e.g., data 206) to data stored in association with the process identifier. For example, data reverter 228 may identify data 204 based on a process identifier and may revert data 206 to data 204 before modification according to the adaptation process. Data store 130 may be updated with data 204 as the current data for a product. Data reverter 228 may store output information in an output log indicating a result of the data reversion process.

FIG. 3 illustrates an example of data 300 associated with a plurality of attributes according to some embodiments of the present invention. Data 300 is an example of data 132 or data 202. Data 300 may be in an unstructured format, a structured format, or a combination thereof. For example, data 300 may be in a structured format (e.g., an XML format). Information in data 300 may be organized using one or a combination of many types of data structures including, without restriction, an array, a record, a relational database table, a hash table, a linked list, or other types of data structures. For purposes of illustration, data 300 is shown in an XML format; however, data 300 may be implemented using other data structures and/or formatting techniques that are different from the format of data 300 shown in FIG. 3.

In certain embodiments, data 300 may be associated with one or more attributes. The attribute(s) may be defined with respect to a product. In the example shown in FIG. 3, data 300 may include a one or more pairs of tags. A pair of tags may be formatted using one of many types of formatting techniques, e.g., XML formatting. A pair of subject tags (e.g., "<subject area>" and "</subject area>") may correspond to a portion of data 300 related to a "subject area" indicated by a subject area attribute name (e.g., "name") in the subject area tags. For example, data 302 associated with a subject area defined by subject area tags may correspond to a portion of data 300 related to the subject area (e.g., "Payables Invoices—Holds Real Time") indicated by the subject area attribute name in the tags.

Data 302 may include one or more pairs of folder tags (e.g., "<folder>" and "</folder>") that correspond to a portion of data 302 that has a relationship with a subject area. For example, the name of a folder may correspond to a category within a subject area. A pair of folder tags related to a subject area may include a folder attribute name (e.g., "name") that indicates the name of a folder corresponding to the category. For example, data 304 included in a portion the data 302 may include data related to a category (e.g., "Header Information") indicated by the folder attribute name associated with the folder tags.

Data 304 may include one or more pairs of data tags (e.g., "<data>" and "</data>") that define data in folder. A pair of tags for data may include an attribute name (e.g., "name") that indicates the name of the data having a relationship with a category corresponding to a folder defined by the folder tags. For example, data 306 within the data tags may be related to a category (e.g., "Header Information") indicated by the folder attribute name associated with the folder tags.

The attributes associated with data 300 for a pair of tags may change from one version of a product to another version of the product. For example, a value of the attribute name for a pair of tags may be renamed, such that a newer version of the product may identify information in data 300 based on a different attribute name. In another example, the attribute name for a pair of tags may be removed altogether such that the data contained by those tags is not associated with the attribute name.

Now turning to FIG. 4 is an example of a data structure 400 of information ("adaptation information") (e.g., adaptation information 136) about changes to data attributes according to some embodiments of the present invention. Specifically, adaptation information may be used by data adaptation system to determine attributes to modify corresponding to a change from one version of a product (e.g., an application) to another version of the product. For example, the adaptation information shown in data structure 400 indicates a change in one or more attributes of data from a previous version (e.g., previous release) of an application to a current version (e.g., current release) of an application. Examples of data may include data 300 of FIG. 3.

Data structure 400 may be implemented as one or a combination of different types of data structures including, without restriction, an array, a record, a relational database table, a hash table, a linked list, or other types of data structures. In some embodiments, data structure 400 may be stored in a data file, such as a comma-separated values (CSV) file. A format of data structure 400 may be determined based on a format of a data file in which adaptation information is stored. For purposes of illustration, data structure 400 is shown in a particular arrangement; however, data structure 400 may be implemented using more or less data structures in a different arrangement than shown.

In the example shown in FIG. 4, data structure 400 may include one or more data records (e.g., a row in data structure 400), such as data records 402, 404, 406, 408, 410, 412, 414, 416. As explained above for reference to FIG. 3, data may be organized by association with a plurality of attributes. A data record may indicate a value corresponding to one or more attributes (e.g., a subject area attribute name, a folder attribute name, and an attribute name). In some instances, a data record may have a zero value or a null value (e.g., "NULL") indicating that an attribute corresponding to that item in the record is not associated with any data. A data record may include code information 430 that indicates a type of change, if any, to an attribute indicated in the data record. Examples of a type of change include, without limitation, rename, remove, and restructure. In some embodiments, one or more types of changes may be user defined.

In some embodiments, a data record may indicate a condition for a change to an attribute indicated in the data record. A condition for a change may correspond to a change in a version of a product. Other changes can include changes to functions or a features of a product that access data (e.g., data 300). For example, a data record may indicate a condition for a change in one or more attributes of data (e.g., data 300) from one for one version (e.g., a previous release) of a product (e.g., an application) to a different version (e.g., a current release) of the product. In the example shown in FIG. 4, a data record may indicate a value corresponding to each of a plurality of attributes (e.g., a subject area attribute name, a folder attribute name, and an attribute name) associated with data for a first version (e.g., a previous release) of a product and a value corresponding to each of the plurality of attributes for a second version (e.g., a current release) of the product.

In some embodiments, data structure 400 can be organized differently than shown in FIG. 4. Data structure 400 may be organized such that attribute changes grouped based on one or more criteria, such as a type of change, a condition for a change, or an attribute. Accordingly, attribute changes may be identified based on the groupings defined for data structure 400.

Code 430 in record 402 indicates an attribute remove ("ATTR_REMOVE") type of change for an attribute identified in record 402. An attribute remove change may indicate that an attribute that is present in a previous release of a product is deleted or removed in the current release of that product. The attribute indicated by in record 402 may correspond to an attribute name indicated by "<data>" tags as described with reference to FIG. 3. The attribute to be removed is an attribute name 436 ("Attribute name (Previous Release)") in record 402. The data corresponding to attribute name 436 may be in data corresponding to a subject area having a subject area attribute name 432 for a previous release ("SA Name (Previous Release)") and to a folder of that subject area having a folder attribute name 434 for a previous release ("Folder Name (Previous Release)") indicated by record 402. Record 402 indicates that folder attribute name 436 is removed in a current release as indicated by a "NULL" value corresponding to an attribute name 442 ("Attribute Name (Current Release)"). Record 402 indicates that each of an attribute name 432 for a subject area and a folder attribute name 434 for a folder including data associated with attribute name 436 in record 402 may also be removed in the current release.

Code 430 in record 404 indicates a folder remove ("FOLDER_REMOVE") type of change for an attribute identified in record 404. A folder remove change may indicate that an attribute of a folder that is present in the previous release is deleted in the current release. The attribute of a folder may correspond to a folder attribute name indicated by folder tags. In this example, the attribute to be removed is a folder attribute name 434 of a folder for a previous release ("Folder name (Previous Release)") in record 404. A folder may be in a subject area having an attribute name 432 for a previous release ("SA Name (Previous Release)") indicated by record 404. Record 404 indicates that folder attribute name 434 in record 404 is removed in a current release as indicated by a "NULL" value corresponding to a folder attribute name 440 of the folder for a current release ("Folder Name (Current Release)"). Record 404 may indicate that each of a subject area attribute name for a subject area 438 (e.g., SA Name (Current Release)) and an attribute name 442 for data (e.g., attribute name (Current Release)) in record 404 may be removed.

Code 430 in record 406 indicates an attribute rename ("ATTR_RENAME") type of change for an attribute identified in record 406. A attribute rename change may indicate that an attribute that is present in the previous release is renamed in the current release. The attribute to be renamed is an attribute name 436 for a previous release ("Attribute name (Previous Release)") in record 406. The data corresponding to attribute name 436 may be in a subject area having a subject area attribute name 432 for a previous release ("SA Name (Previous Release)") and may be in a folder of that subject area having a folder attribute name 434 for the previous release ("Folder Name (Previous Release)") indicated by record 406. Record 406 indicates that attribute name 436 is renamed in a current release as indicated by an attribute name 442 ("Attribute Name (Current Release)"), which is different than attribute name 436 in record 406. Record 406 indicates that each of a subject area attribute name 438 for a subject area in a current release (e.g., SA Name (Current Release)) and a folder attribute name 4440 for a folder in the current release (e.g., Folder Name (Current Release)) in record 406 including data associated with attribute name 442 in record 402 may remain unchanged in the current release.

Code 430 in record 408 indicates a folder rename ("FOLDER_RENAME") type of change for a folder attribute name identified in record 406. A folder rename change may indicate that a folder attribute name that is present in the previous release is renamed in the current release. The folder attribute name to be renamed corresponds to a folder attribute name 434 of a previous release ("Folder name (Previous Release)") in record 408. The data corresponding to folder attribute name 434 may be in a subject area having a subject area attribute name 432 ("SA Name (Previous Release)") indicated by record 408. Record 408 indicates that folder attribute name 434 for a folder is renamed in a current release as indicated by a folder attribute name 440 of the folder ("Folder Name (Current Release)"), which is different folder attribute name 434 in record 406.

Code 430 in record 410 indicates a subject area rename ("SA_RENAME") type of change for a folder attribute name identified in record 410. A subject area rename change may indicate that a subject area name that is present in the previous release is renamed in the current release. The subject area name to be renamed corresponds to a subject area attribute name 432 of a subject area ("SA name (Previous Release)") in record 410. Record 410 indicates that subject area attribute name 432 is renamed in a current release as indicated by subject area attribute name 438 ("SA Name (Current Release)"), which is different than subject area attribute name 432 in record 410.

Code 430 in record 412 indicates a folder restructure ("FOLDER_RESTRUCTURE") type of change for an attribute identified in record 412. In some embodiments, a folder restructure may be similar to renaming a folder attribute name since the folder name may be changed. A folder restructure change may indicate that an attribute of a folder that is present in the previous release is renamed in the current release. In this example, the attribute to be restructured is a folder attribute name 434 of a folder for a previous release ("Folder name (Previous Release)") in record 412. The folder may have a relationship with a subject area having a subject area attribute name 432 ("SA Name (Previous Release)") indicated by record 412. Record 412 indicates that subject area attribute name 434 in record 412 is renamed in a current release as indicated by folder attribute name 440 ("Folder Name (Current Release)"), which is different than folder attribute name 434 in record 412.

In some embodiments, the folder restructure may correspond to changing a relationship of a folder from one subject area to a different subject area. As such, a folder restructure may include associating a pair of folder tags and data included in those folder tags from one subject area to another subject area. For example, the pair of folder tags and the data may be moved insider a different pair of subject area tags corresponding to a different subject area. The folder attribute name indicated by those folder tags may be associated with a different subject area attribute name corresponding to a pair of subject area tags that include the folder tags and data. A relationship of the folder attribute name may change from one subject area attribute name to another subject area attribute name. In the example shown in FIG. 4, subject area attribute name 432 of a previous release may be renamed to a different subject area attribute name 438 in record 412 for a folder that is restructured.

Code 430 in record 414 indicates an attribute restructure ("ATTR_RESTRUCTURE") type of change for an attribute identified in record 414. In some embodiments, an attribute restructure may be similar to renaming the attribute since the attribute name may be changed. As such, an attribute restructure change may indicate that an attribute that is present in the previous release is renamed in the current release. In some embodiments, an attribute may not be renamed for restructuring, rather the attribute associated with data may be moved (e.g., "restructured") to another subject area or folder. The attribute to be restructured is an attribute name 436 ("Attribute name (Previous Release)") in record 414. The data corresponding to attribute name 436 may have a relationship with a subject area having subject area attribute name 432 for a previous release ("SA Name (Previous Release)") and may have a relationship with a folder of that subject area having folder attribute name 434 ("Folder Name (Previous Release)") indicated by record 414. Record 414 indicates that attribute name 436 is restructured in a current release such that attribute name 436 and its corresponding folder attribute name 436 in record 414 may be associated with a different subject area having a different subject area attribute name. In record 414, attribute name 442 for a current release ("Attribute Name (Current Release)") is unchanged from attribute name 436 and folder attribute name 440 for a folder in a current release ("Folder Name (Current Release)") is unchanged from folder attribute name 434 for the folder in a previous release; however, subject area attribute name 432 may be changed to subject area attribute name 438 ("SA Name (Current Release)") in record 414.

In some embodiments, one or more codes (e.g., code 430) may be custom defined to indicate a type of change different from those types identified above. For example, code 430 in record 416 may indicate a last attribute name ("LAST_ATTR_RENAME") type of change for an attribute name in record 416. A last attribute change may indicate a change in an attribute (e.g., an attribute name) of data in record 416. The change in an attribute may correspond to a change in any attribute, such as a subject area attribute name, a folder attribute name, or an attribute name. In the example shown in FIG. 4, last attribute change indicates a change in attribute name 436 ("Attribute Name (Previous Release)") of an attribute in a previous release to a different attribute name 442 ("Attribute Name (Current Release)") in a current release.

Figure 5:
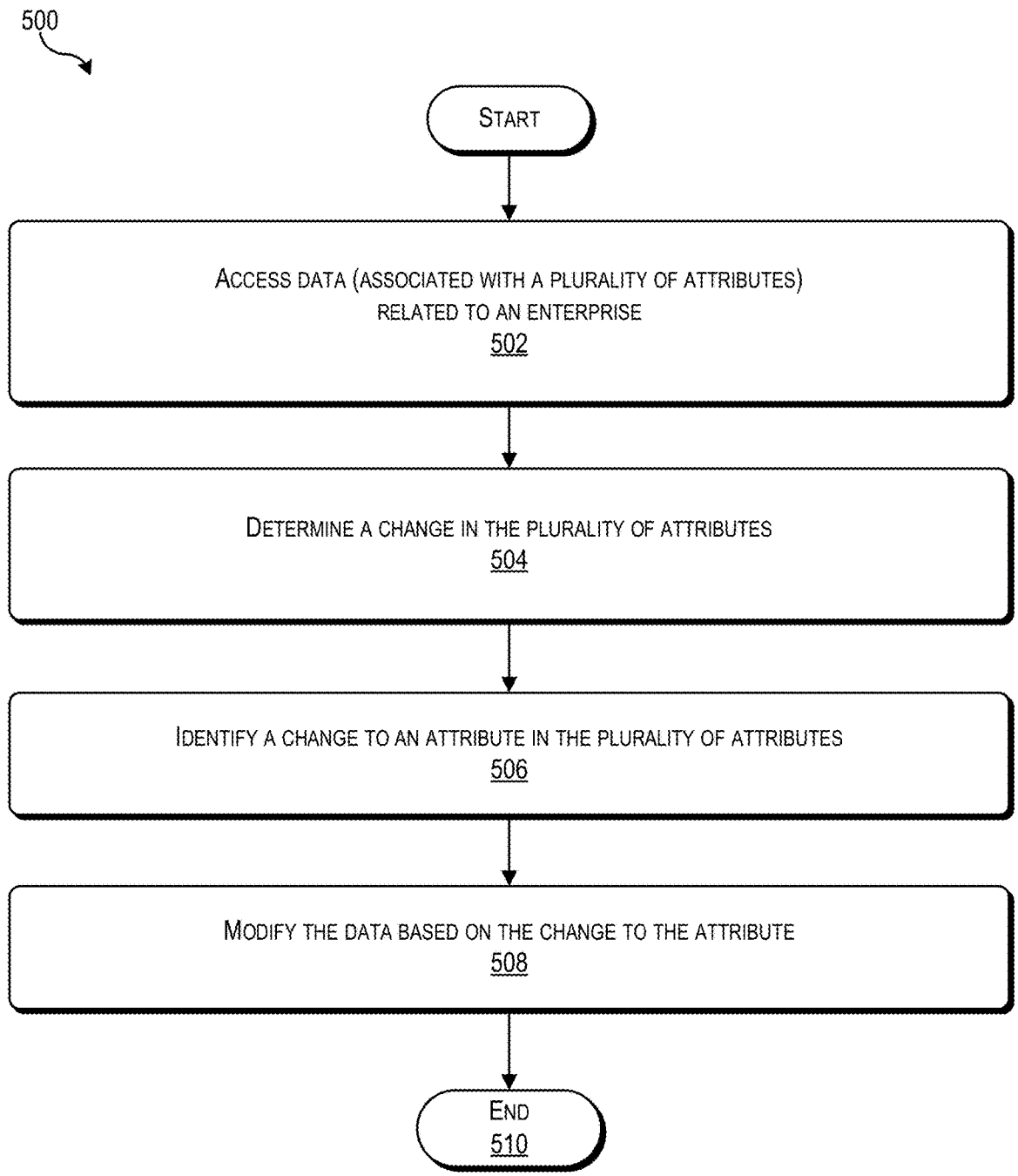
FIG. 5 is a flowchart illustrating a process for adapting data for a change in a data attribute according to some embodiments of the present invention.

Now turning to FIG. 5 is a flowchart 500 illustrating a process for adapting data for a change in a data attribute according to some embodiments of the present invention. The process depicted by flowchart 500 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps of flowchart 500 is not intended to be limiting. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. While processing depicted in FIG. 5 is with respect to a change in data for a single application, the processing may be performed for multiple applications, each of which is impacted by a different change in an attribute associated with data. One of ordinary skill in the art would recognize many variations, modifications, and alternatives. In some embodiments, the process depicted in FIG. 5 may be performed by data adaptation system 120 depicted in FIGS. 1 and 2.

The processing in flowchart 500 is initiated, at 502, by accessing data related to an enterprise (e.g., data 202). The data may be associated with a plurality of attributes. In some embodiments, the plurality of attribute(s) associated with the data may correspond to a version of an application.

The data may be accessed from one or more data stores (e.g., data store 130). Accessing the data may include retrieving the data from a data store. For example, data adaptation system 120 may access data 132 from data store 130. The data may be formatted based on the plurality of attributes corresponding to the version of the application. A format of the data may be based on the plurality of attributes associated with the data, such that information in the data corresponding to an attribute may be identified based on the attribute.

A change in the plurality of attributes associated with the data (e.g., the data accessed at 502) may be determined, at 504. A change in the plurality of attributes may be determined using adaptation information (e.g., adaptation information 400). A change in the plurality of attributes may be determined by processing the adaptation information to determine whether any attributes are identified in the adaptation information. A change in an attribute may be associated with a condition for the change. For example, a condition for a change may be defined as a change in a product (e.g., a change in a version of the product). In this example, a change in a plurality of attributes may be determined based on the change in the product. In some instances, multiple attributes may change based on a condition. Subsequent processing may be performed below to identify that an attribute in the plurality of attributes has in fact changed. In some embodiments, multiple attributes may change differently, although their changes may be based on one or more of the same conditions.

At 506, a change to an attribute in the plurality of attributes associated with data may be identified. A change to an attribute of the plurality of attributes may be identified based on the attribute change determined at 504. A change to an attribute of a plurality of attributes may be determined based on whether the condition(s) for the change to the attribute has occurred. The condition(s) for a change to an attribute may be evaluated to determine whether any of those conditions for change have occurred. A change to an attribute may be identified when a condition for a change to an attribute has occurred. For example, when a condition is a change from one version of a product to another version of the product, processing may be performed to determine whether the product has changed versions according to the condition. The condition(s) corresponding to each of the plurality of attributes identified the adaptation information may be evaluated to determine whether the condition(s) have occurred.

An attribute of the plurality of attributes associated with the data (e.g., the data accessed at 502) may be modified, at

508, based on the identified change to the attribute. In some embodiments, the adaptation information may indicate a type of change in an attribute of the plurality of attributes when a condition for the change has occurred. As such, for an attribute which has been identified as having changed, the attribute may be modified according to the type of change indicated by the adaptation information for that attribute. Examples of types of changes are described with reference to FIG. 4.

Processing for flowchart 500 may end at 510.

Figure 6:
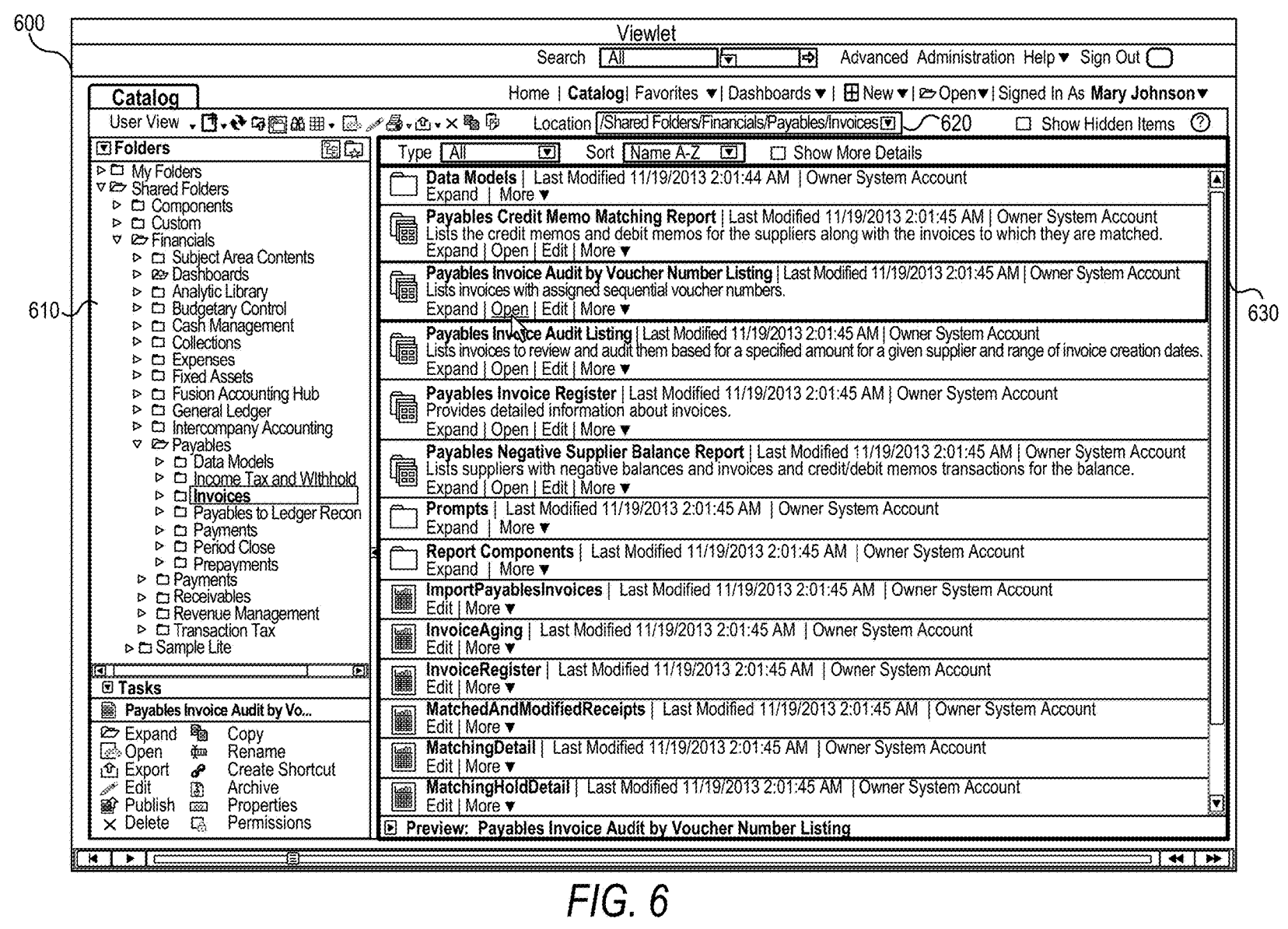

FIG. 6 illustrates an example of a graphical user interface (GUI) 600 that displays data related to an enterprise according to some embodiments of the present invention. GUI 600 may be displayed at any one of client devices 102. GUI 600 may be displayed for a product (e.g., an application) implemented on a computing device, e.g., any one of client devices 102. In some embodiments, a product may be implemented at computing system distinct from a client device, while GUI 600 is displayed at the client device. In some embodiments, GUI 600 may be displayed differently (e.g., a different appearance or layout) corresponding to a version of the product for GUI 600 is implemented. GUI 600 may include more or fewer interactive elements and/or GUIs in GUI 600 than shown based on a version of the product for which GUI is implemented. In some embodiments, GUI 600 may provide interactive elements to access features or functions of a product. The features or functions that are accessible may vary based on the version of the product.

In some embodiments, GUI 600 may be interactive to receive input to request access to data related to an enterprise. For example, GUI 600 may include one or more GUIs, e.g., GUI 610, to access specific categories of data related to an enterprise. GUI 610 may display one or more levels of folders, each of which may correspond to an interactive element. One or more folders shown in 610 may be configurable by a user. A category of data (e.g., financials data) may correspond to a folder, such as any folder (e.g., "Financials") under "Shared Folders" as shown in 610. A category of data may include one or more folders, each of which may be part of a subject area of data related to an enterprise (e.g., "Budgetary Controls", "Payables", or "General Ledger"). One or more sub-folders may be visible upon interaction with a folder. A sub-folder may correspond to an interactive element. One or more sub-folders within a subject area may correspond to additional sub-categories of data within a subject area. The structure of folders may correspond to a relationship of attributes associated with data corresponding to each of the folders. Data (e.g., data 300) includes examples of attributes associated with the data based on the relationships described above in GUI 610. The folders shown in 610 may be based on one or more attributes (e.g., an attribute name) associated with data (e.g., data 300) accessible via GUI 600.

In some embodiments, interaction with a folder or a sub-folder (e.g., "Invoices") may cause GUI 600 to display another GUI, e.g., GUI 630. In GUI 600, an interactive element 620 may be displayed that indicates the relationship of attribute names corresponding to the selected folders in GUI 610.

GUI 630 may include one or more interactive areas. Each of the interactive areas may correspond to an attribute name (e.g., "Data Models", "Payables Credit Memo Matching Report", etc.) associated with data corresponding to a level of folders selected in GUI 610. An interactive area may include one or more interactive elements, such as those labeled "Expand", "Open", "Edit", and "More". Interaction with an interactive element in the interactive area may cause an application that provides GUI 600 to request access to data (e.g., data 300) for the application providing GUI 600. The data that is accessed based on interaction with an interactive element may be associated with one or more attributes.

Data adaptation system 120 may analyze adaptation information to determine whether the adaptation information indicates a change in the attribute(s) associated with the data requested for the application and whether each of the change(s) are associated with a condition. Before the data associated with that attribute(s) is accessed, the attribute(s) associated with the data may be modified according to the changes if the condition has occurred. The attribute(s) may be modified according to a change in the attribute(s) indicated by the adaptation information.

Once the data has been adapted for changes in attributes, the data associated with the attribute name may be accessed by the application. A report may be generated by the application based on the data that is adapted. The report may be generated using the attribute(s) associated with the data including the modified attribute(s). GUI 600 may be adjusted to display a report using information obtained from the adapted data using the attributes.

Figure 7:
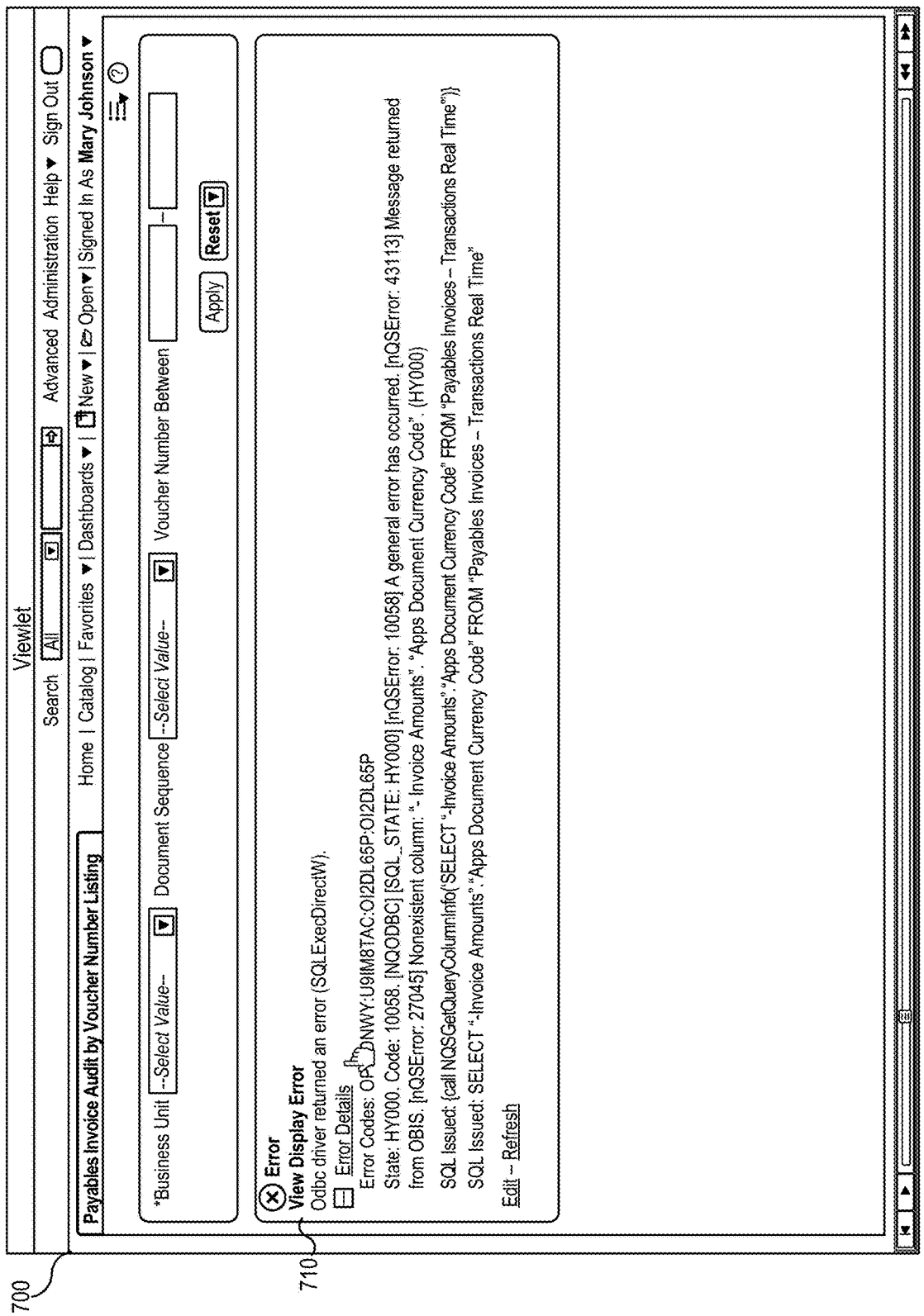
FIG. 7 illustrates an example of a graphical user interface that displays information that indicates an error in data based on a change in an attribute according to some embodiments of the present invention.

FIG. 7 illustrates an example of a graphical user interface (GUI) 700 that displays information that indicates an error in data based on a change in an attribute according to some embodiments of the present invention. GUI 700 may include a GUI 710 that displays error information about an error that occurred for accessing data that was not adapted for a change in an attribute for a product. Upon interaction with GUI 600, GUI 700 is displayed with an example of information that may be displayed when data is unable to be accessed using an attribute associated with the data. The error information may be determined by the application when the application is unable to obtain information for an attribute that has changed for the product. In some embodiments, adaptation of the data by data adaptation system 120, GUI 700 may prevent errors in accessing information in the data because the data can be automatically adapted for changes in attributes associated with the data before the data is accessed by the application.

Figure 8:
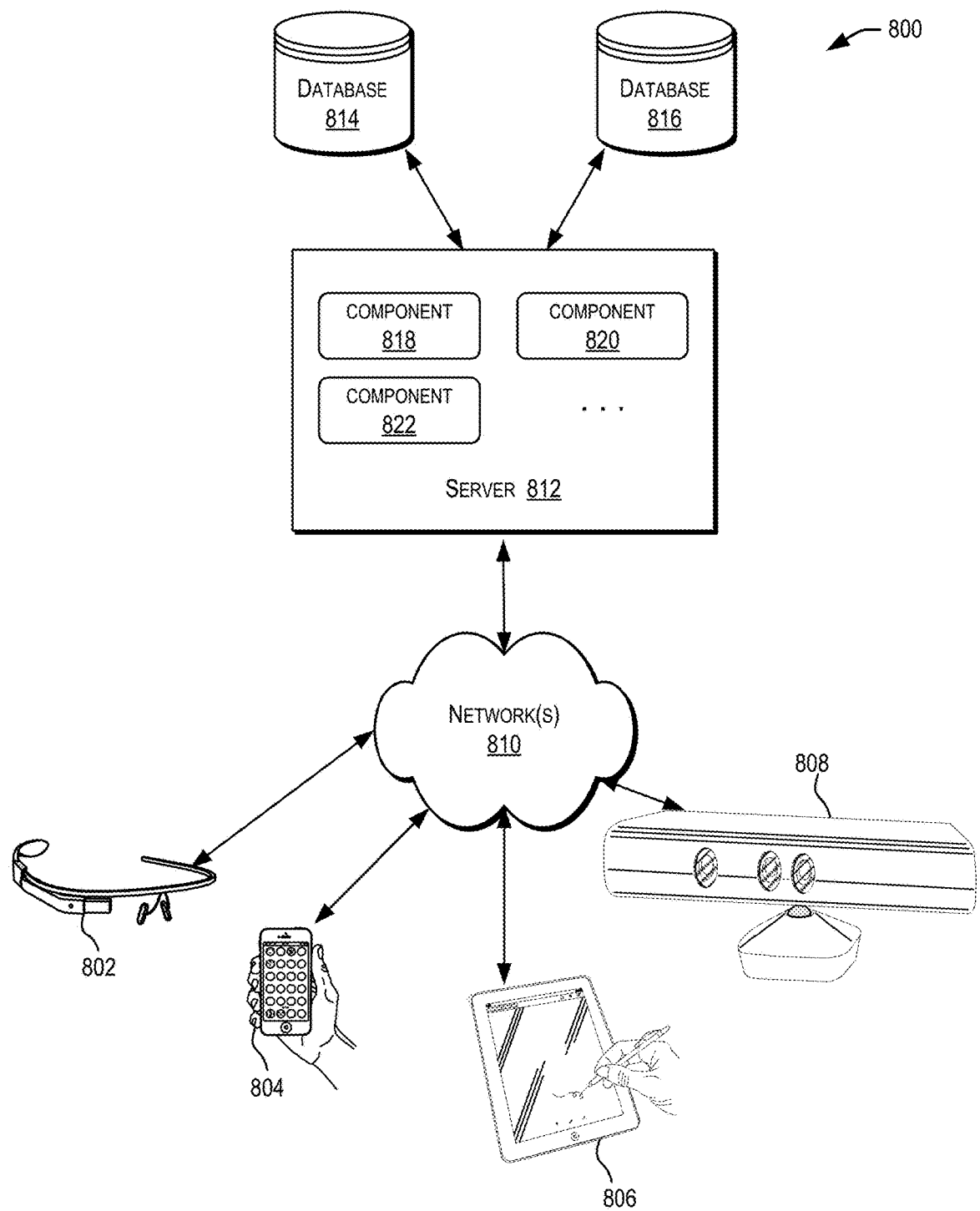
FIG. 8 depicts a simplified diagram of a distributed system for implementing an embodiment.

FIG. 8 depicts a simplified diagram of a distributed system 800 for implementing an embodiment. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications such as services and applications that may implement a data adaptation system to adapt data for changes in attributes associated with the data (e.g., data related to an enterprise). In certain embodiments, server 812 may also provide other services or software applications can include non-virtual and virtual environments. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

Client computing devices 802, 804, 806, and/or 808 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 810.

Although distributed system 800 in FIG. 8 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing as described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. These databases may provide a mechanism for storing information such as user interactions information, usage patterns information, adaptation rules information, and other information used by embodiments of the present invention. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle that are adapted to store, update, and retrieve data in response to SQL-formatted commands.

Figure 9:
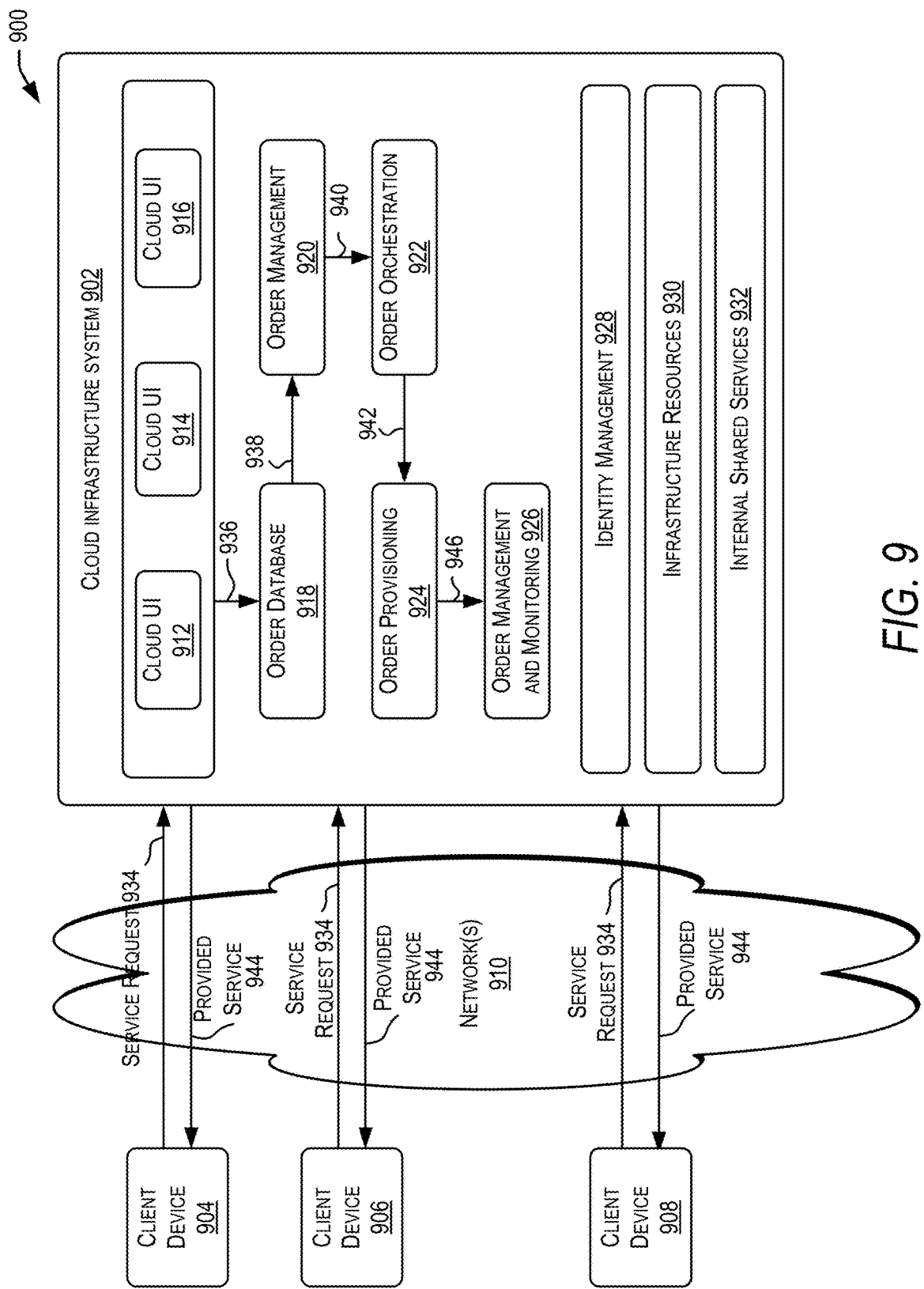
FIG. 9 is a simplified block diagram of one or more components of a system environment in which services may be offered as cloud services, in accordance with an embodiment of the present disclosure.

In some embodiments, a cloud environment may provide one or more services for adapting data for changes in attributes associated with the data (e.g., data related to an enterprise). FIG. 9 is a simplified block diagram of one or more components of a system environment 900 in which services may be offered as cloud services, in accordance with an embodiment of the present disclosure. In the illustrated embodiment in FIG. 9, system environment 900 includes one or more client computing devices 904, 906, and 908 that may be used by users to interact with a cloud infrastructure system 902 that provides cloud services, including services for adapting data for changes in attributes associated with the data (e.g., data related to an enterprise). Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

In certain embodiments, services provided by cloud infrastructure system 902 may include a host of services that are made available to users of the cloud infrastructure system on demand. In addition to services related to adapting data for changes in attributes associated with the data (e.g., data related to an enterprise), various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provision of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 922 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
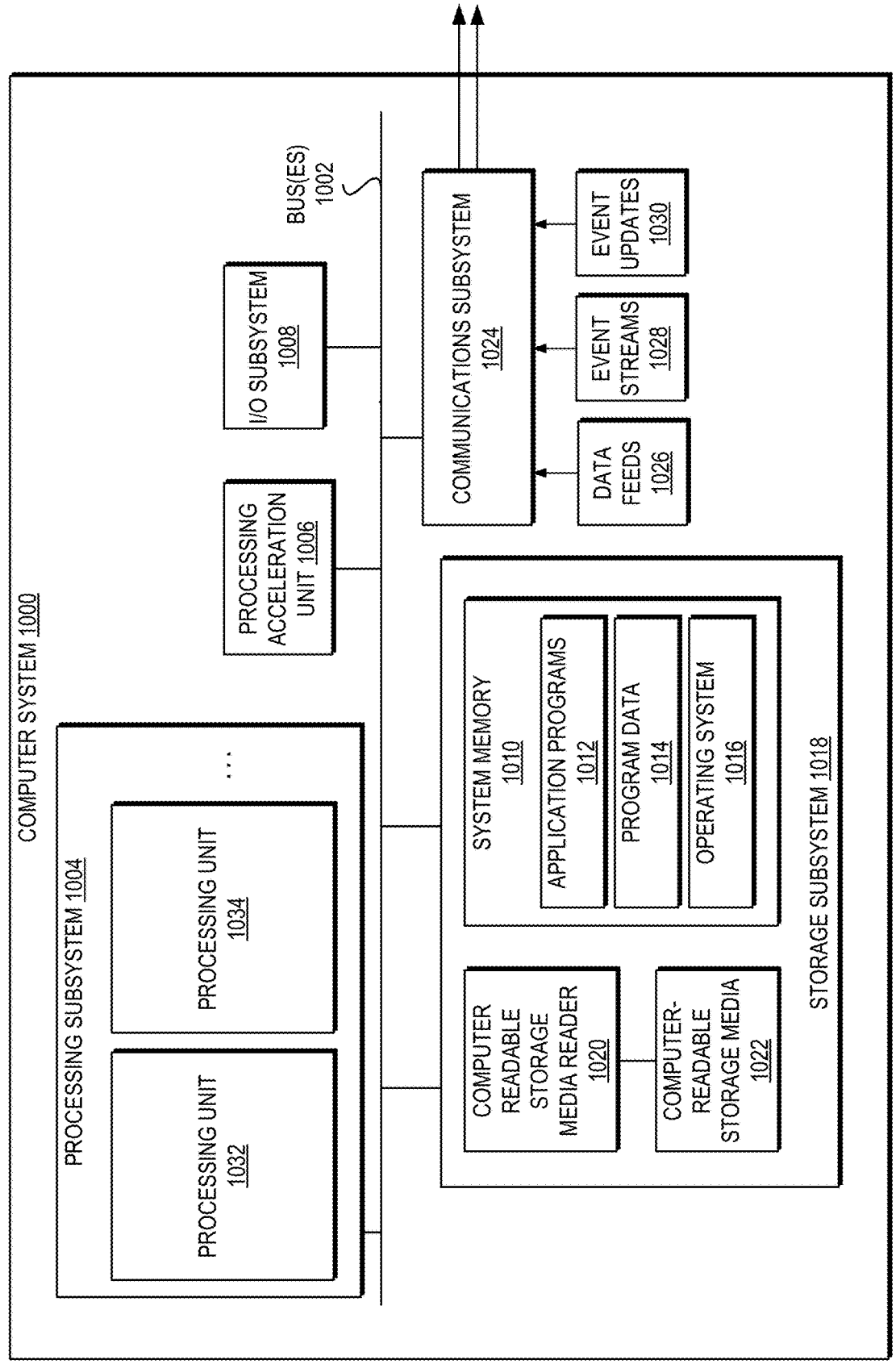
FIG. 10 illustrates an exemplary computer system that may be used to implement an embodiment of the present invention.

FIG. 10 illustrates an exemplary computer system 1000 that may be used to implement an embodiment of the present invention. In some embodiments, computer system 1000 may be used to implement any of the various servers and computer systems described above. As shown in FIG. 10, computer system 1000 includes various subsystems including a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above for adapting data for changes in attributes associated with the data (e.g., data related to an enterprise).

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   storing data for an application, wherein the application previously underwent a modification from a first version of the application to a second version of the application, and wherein the modification caused a first change in a plurality of attributes associated with the data as stored in a data store for the application that made the data compatible with the second version of the application and made the data no longer compatible with the first version of the application;
   receiving, by a computing system, a request from the first version of the application, wherein the request requests the data for the first version of the application from the data store after the data is no longer compatible with the first version of the application; and
   in response to receiving the request, using a data adaption system to perform operations comprising:
      retrieving the data from the data store after the data is no longer compatible with the first version of the application;
      identifying, by the computing system, the first change in the plurality of attributes associated with the data that was previously caused by the modification of the application from the first version of the application to the second version of the application;
      identifying, by the computing system, based on the first change in the plurality of attributes, a second change to a first attribute in the plurality of attributes that will make the data backwards compatible with the first version of the application;

applying, by the computing system, the second change to modify the first attribute to make the data backwards compatible with the first version of the application after the data is retrieved from the data store and before the data is sent to the first version of the application; and sending, by the computing system, the data to the first version of the application in response to the request.

2. The method of claim 1, wherein the modification of the application corresponds to an upgrade of the application from the first version of the application to the second version of the application.

3. The method of claim 1, wherein the modification of the application corresponds to a downgrade of the application from the first version of the application to the second version of the application.

4. The method of claim 1, wherein the first change in the plurality of attributes is determined using a data file, wherein the data file indicates a change to one or more attributes of the plurality of attributes corresponding to the modification of the application.

5. The method of claim 1, wherein the first attribute is a name, and wherein the second change to the first attribute is renaming the first attribute.

6. The method of claim 1, wherein the first attribute corresponds to a name of a folder, and wherein the second change to the first attribute is renaming the name of the folder.

7. The method of claim 1, wherein the first attribute corresponds to a name of a subject area, and wherein the second change to the first attribute is renaming the subject area.

8. The method of claim 1, wherein the second change to the first attribute is removing an association of the first attribute with the data.

9. The method of claim 1, wherein the second change to the first attribute is restructuring the data associated with the first attribute.

10. The method of claim 9, wherein the first attribute has a relationship with a second attribute of the plurality of attributes, and wherein restructuring the data associated with the first attribute includes changing the relationship of the first attribute with the second attribute to a relationship between the first attribute and a third attribute of the plurality of attributes.

11. The method of claim 10, wherein the first attribute corresponds to a name, wherein the second attribute corresponds to a name of a first folder, and wherein the third attribute corresponds to a name of a second folder.

12. The method of claim 10, wherein the first attribute corresponds to a name of a folder, wherein the second attribute corresponds to a name of a first subject area, and wherein the third attribute corresponds to a name of a second subject area.

13. The method of claim 1, further comprising: generating, by the computing system, for the second version of the application, a report based on the data, wherein the report is generated using the plurality of attributes including the first attribute after the second change has been applied.

14. A system comprising:
one or more processors; and
a memory storing instructions that, when executed by the one or more processors, cause the one or more processors to:

store data for an application, wherein the application previously underwent a modification from a first version of the application to a second version of the application, and wherein the modification caused a first change in a plurality of attributes associated with the data as stored in a data store for the application that made the data compatible with the second version of the application and made the data no longer compatible with the first version of the application;

receiving, by a computing system, a request from the first version of the application, wherein the request requests the data for the first version of the application from the data store after the data is no longer compatible with the first version of the application; and in response to receiving the request, use a data adaption system to perform operations comprising:

retrieving the data from the data store after the data is no longer compatible with the first version of the application;

identifying, by the computing system, the first change in the plurality of attributes associated with the data that was previously caused by the modification of the application from the first version of the application to the second version of the application;

identifying, by the computing system, based on the first change in the plurality of attributes, a second change to a first attribute in the plurality of attributes that will make the data backwards compatible with the first version of the application;

applying, by the computing system, the second change to modify the first attribute to make the data backwards compatible with the first version of the application after the data is retrieved from the data store and before the data is sent to the first version of the application; and sending, by the computing system, the data to the first version of the application in response to the request.

15. The system of claim 14, wherein the modification of the application corresponds to an upgrade or a downgrade of the application from the first version of the application to the second version of the application.

16. The system of claim 14, wherein the second change to the first attribute is restructuring the data associated with the first attribute, wherein the first attribute has a relationship with a second attribute of the plurality of attributes, and wherein restructuring the data associated with the first attribute includes changing the relationship of the first attribute with the second attribute to a relationship between the first attribute and a third attribute of the plurality of attributes.

17. The system of claim 14, wherein the second change in the first attribute is renaming the first attribute.

18. The system of claim 14, wherein the second change in the first attribute is removing an association of the first attribute with the data.

19. A non-transitory computer-readable memory storing a set of instructions that are executable by one or more processors to:

store data for an application, wherein the application previously underwent a modification from a first version of the application to a second version of the application, and wherein the modification caused a first change in a plurality of attributes associated with the data as stored in a data store for the application that made the data compatible with the second version of the application and made the data no longer compatible with the first version of the application;

receiving, by a computing system, a request from the first version of the application, wherein the request requests the data for the first version of the application from the data store after the data is no longer compatible with the first version of the application; and in response to receiving the request, use a data adaption system to perform operations comprising:

retrieving the data from the data store after the data is no longer compatible with the first version of the application;

identifying, by the computing system, the first change in the plurality of attributes associated with the data that was previously caused by the modification of the application from the first version of the application to the second version of the application;

identifying, by the computing system, based on the first change in the plurality of attributes, a second change to a first attribute in the plurality of attributes that will make the data backwards compatible with the first version of the application;

applying, by the computing system, the second change to modify the first attribute to make the data backwards compatible with the first version of the application after the data is retrieved from the data store and before the data is sent to the first version of the application; and sending, by the computing system, the data to the first version of the application in response to the request.

20. The non-transitory computer-readable memory of claim 19, wherein the modification of the application corresponds to an upgrade or a downgrade of the application from the first version of the application to the second version of the application.

\* \* \* \* \*